United States Patent [19]

Schauder

[11] Patent Number: 4,648,022
[45] Date of Patent: Mar. 3, 1987

[54] MATRIX CONVERTER CONTROL SYSTEM

[75] Inventor: Colin D. Schauder, Murrysville Boro, Pa.

[73] Assignee: Westinghouse Electric Corp., Pittsburgh, Pa.

[21] Appl. No.: 829,740

[22] Filed: Feb. 14, 1986

[51] Int. Cl.⁴ .............................................. H02M 5/22
[52] U.S. Cl. .................................... 363/159; 363/161; 363/164
[58] Field of Search .................. 363/10, 159, 160, 161, 363/163, 164, 165

[56] References Cited

U.S. PATENT DOCUMENTS 3,470,447  9/1969  Gyugyi et al. ...................... 363/163
3,493,838  2/1970  Gyugyi et al. ...................... 363/163
3,636,430  1/1972  Kernick et al. ....................... 363/41
3,648,150  3/1972  Kernick et al. ....................... 363/41
3,967,173  6/1976  Stich .................................. 363/132
4,555,755 11/1985  Kurosawa et al. ................... 363/164

Primary Examiner—Patrick R. Salce
Assistant Examiner—Jeffrey Sterrett
Attorney, Agent, or Firm—Charles M. Lorin

[57] ABSTRACT

A three-pulse UFC system uses three groups of three bilateral switches controlled according to a switch polarity pattern to generate AC currents to a load, and a deadband hysteresis having upper and lower limits is used to maintain the load current so as to match a reference current.

4 Claims, 16 Drawing Figures

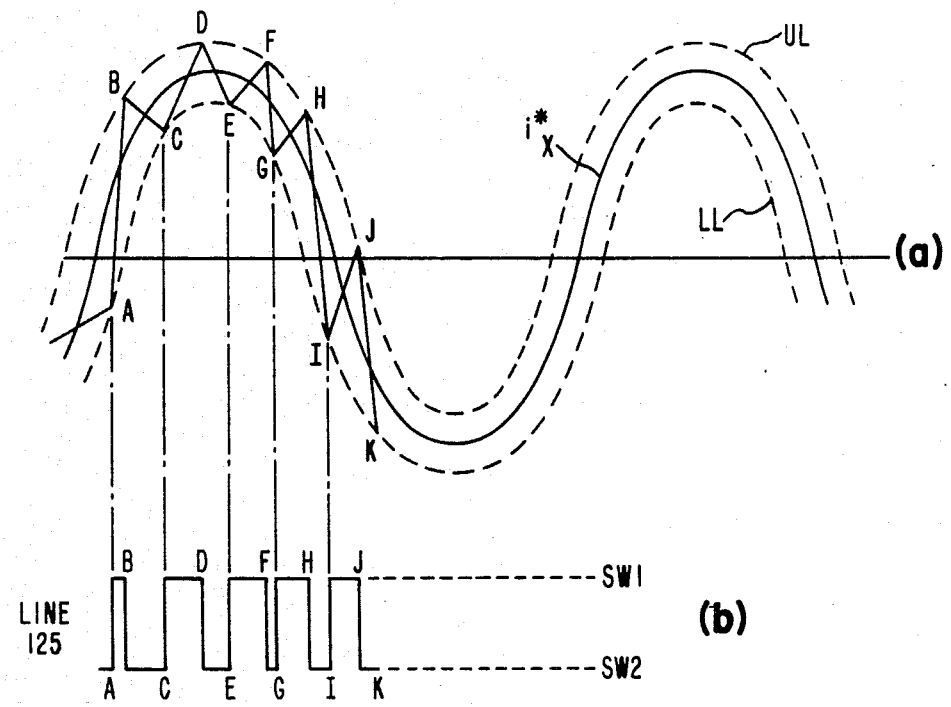
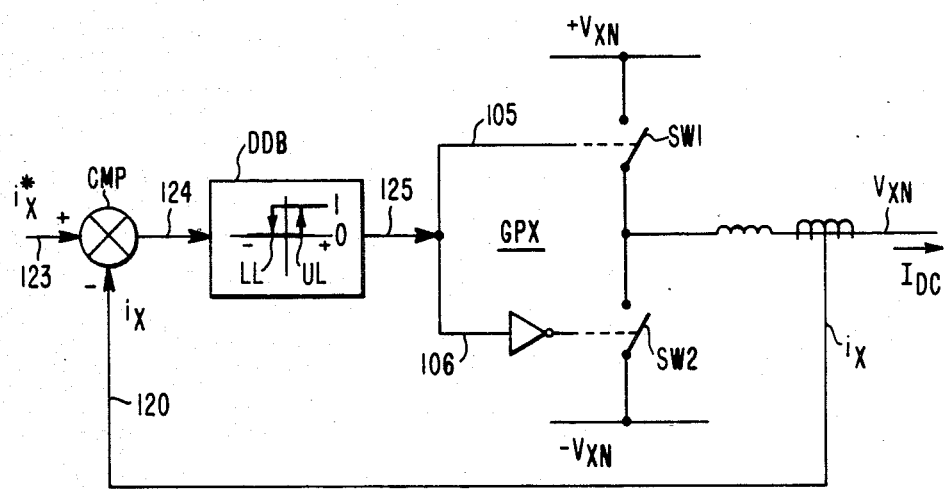
FIG. 7
FIG. 8

MATRIX CONVERTER CONTROL SYSTEM

CROSS-REFERENCE TO RELATED PATENT APPLICATION

The present patent application is related to copending patent application Ser. No. 829,739 filed and entitled "HIDDEN DC-LINK AC-AC CONVERTER USING BILATERAL POWER SWITCHES AND MOTOR DRIVE EMBODYING THE SAME". This cross-referenced patent application is hereby incorporated by reference.

BACKGROUND OF THE INVENTION

As explained in the cross-referenced patent application bilateral switches have been used in the unrestricted frequency changer (UFC) to sequentially connect input and output AC lines for both directions of flow. While so doing with a proper relation between opposite phase lines through appropriate such bilateral switches, it is possible to treat switch modulation like on an inverter working with a "hidden" DC link input, thereby to create an AC/AC converter working on the principle of the conventional double conversion system i.e. AC/DC and DC/AC converter interconnect by a DC link.

The present invention provides for current and frequency control in a system embodying AC/AC conversion according to the copending case. In its preferred embodiment, use is made of the bang-bang technique. The bang-bang technique is well known. See for instance U.S. Pat. Nos. 3,636,430 and 3,648,150 which relate to inverter control and involve pulse-width modulation.

The invention is particularly applicable to AC motor drives, and it will be described in this context.

SUMMARY OF THE INVENTION

In an AC/AC converter three groups of three bilateral switches are associated with the three AC output lines, respectively, and each switch of a group is associated with a corresponding one of the three AC input lines. Within each group of three switches, the switches are controlled for conduction in accordance with a switching pattern involving successively a positive and a negative polarity in relation to the AC output voltage on the respective phase lines, whereby the bilateral switches are set to conduct for current flow in a direction controlled by polarity according to such switching pattern. This aspect has been disclosed in the afore-mentioned cross-referenced patent application. The present invention resides in controlling the conduction of said bilateral switches by group, thus with a certain phase shift from one group to the other, in response to a current reference signal representing the desired output current and to a feedback current characteristic of the operation of the load, the error in magnitude and sign therebetween being used in a bang-bang fashion to control the current by switching from positive to negative polarity, and conversely, under said switching pattern so as to maintain current between the limits of a deadband including said reference signal as a function of time.

A preferred embodiment of the invention is in the context of a variable speed AC motor drive in which the reference current signal is a signal derived from the input lines of the AC motor by the field-oriented method.

BRIEF DESCRIPTION OF THE INVENTION

FIG. 7 shows the relation between reference current signal and feedback current signal under operation of the control logic of FIG. 6;

FIG. 8 is a symbolic representation of the double-switch operation with the bang-bang technique for one group of bilateral switches and with the control logic of FIG. 6;

DESCRIPTION OF THE INVENTION

Figure 1:
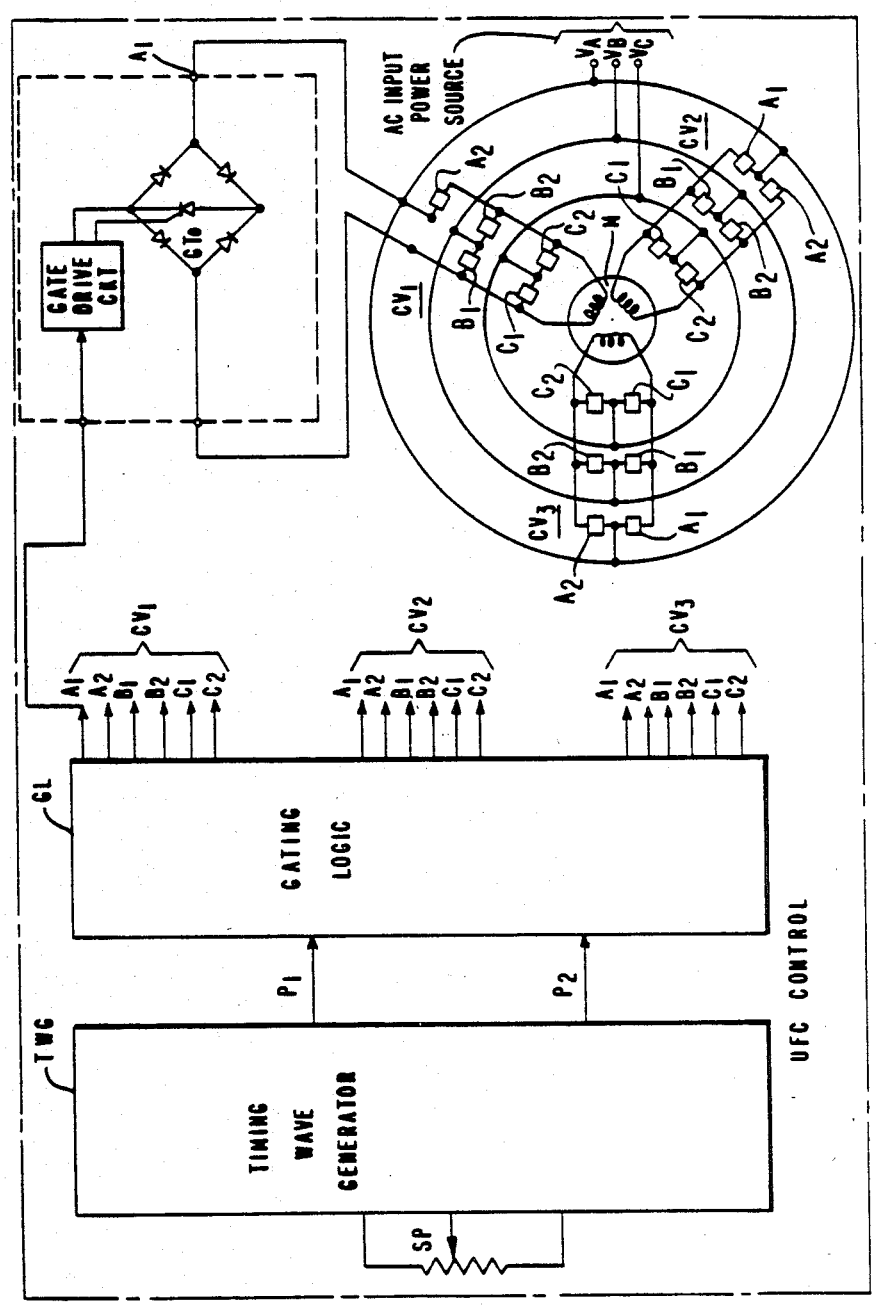
FIG. 1 shows a prior art diagram of a UFC system.

Referring to FIG. 1, an unrestricted frequency changer (UFC), such as disclosed in U.S. Pat. Nos. 3,170,447 and 3,493,838, is shown to include three converters grouping eighteen bilateral switches arranged by groups of six (A1, A2, B1, B2 and C1, C2) between two AC lines of the 3-phase AC input and two AC lines of the 3-phase AC output. As explained in the patents, pairs of bilateral switches of each such converter are controlled so as to conduct during a controlled time interval between two enveloping line-to-line voltages successively from phase line to phase line.

Figure 2:
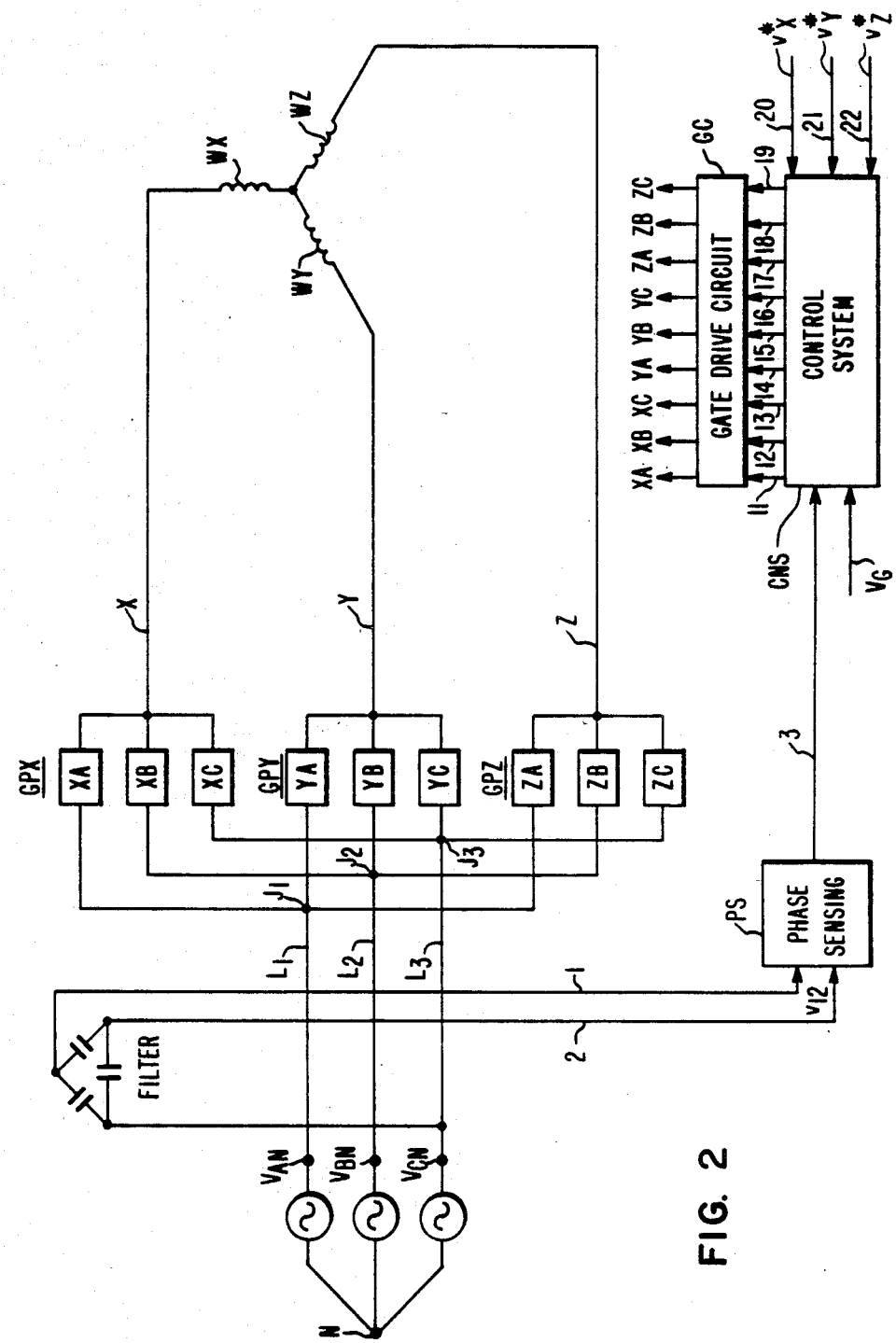
FIG. 2 is a block diagram showing the basic circuit according to the invention.

Referring to FIG. 2, three connecting groups GPX, GPY and GPZ of bilateral switches are provided between the AC sides. However, each group here includes three bilateral switches (XA, XB, XC for group GPX, etc.) instead of six in the case of FIG. 1, and each such group is connected at the input side of the three input phase lines (A,B,C) as in FIG. 1, but to the AC phase lines (X, Y, Z) on the output side, rather than between phase lines as in FIG. 1.

Figure 3:
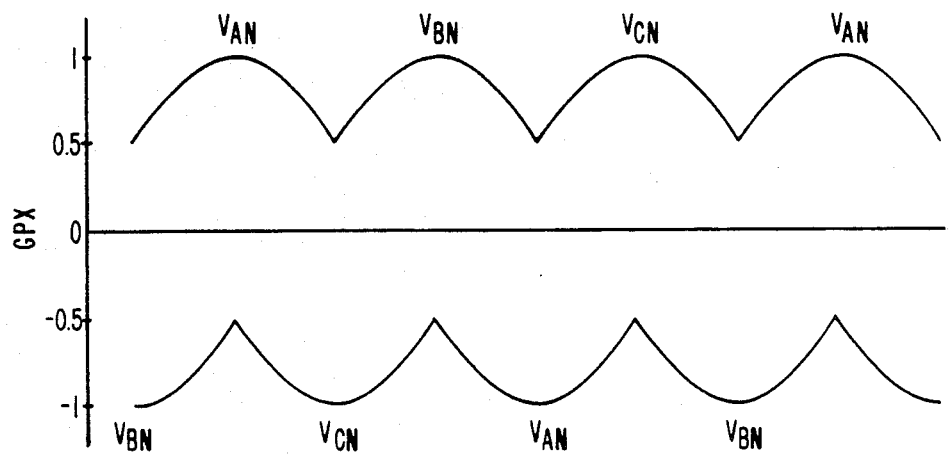
FIG. 3 illustrates with curves the generation of voltage-to-neutral of the AC input polarity waves obtained with power switches connected to an AC input power source.
Figure 4:
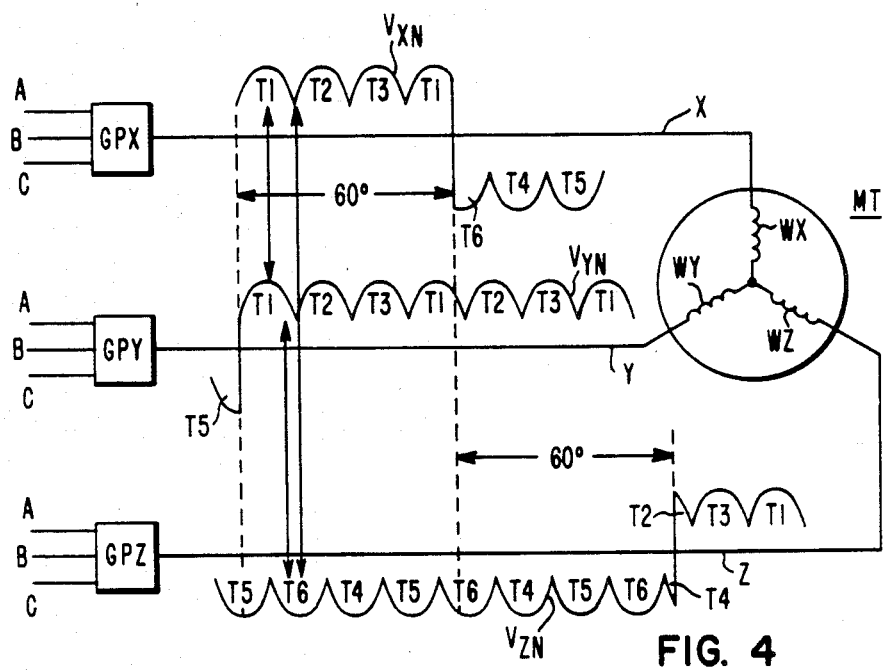
FIG. 4 shows the circuit according to the invention as it appears when controlled to provide a "hidden" DC-link based on FIG. 3 in a six-step situation.

When controlling the converter (GPX, GPY, GPZ) while the bilateral switches are mounted in a bridge across the AC input lines (L1, L2, L3 in FIG. 2) so as to conduct as in a rectifying bridge, the voltage-to-input neutral envelope of the conductive periods from one switch to another in natural commutation succession will be as shown in FIG. 3 for zero firing angle. It is a rectified voltage formed by the successive curves $V_{AN}$, $V_{BN}$ and $V_{CN}$ of positive polarity for output phase line $V_{XN}$ of FIG. 4, for instance, and of negative polarity for $V_{ZN}$ of FIG. 4. At any given time of control as represented on a per-unit basis, i.e., the voltage lies between a maximum of 1 at the peak, and a mimimum of 0.5 at the natural commutation point NC between two voltage curves of the envelope. FIG. 4 shows the situation, with a six-step arrangement. As shown, initially there is a positive polarity on the "hidden" DC-link derived with group GPX and with group GPY, the negative polarity being derived with group GPZ. Then, after a 60 degrees duration, the polarity on line X is reversed and a negative polarity is derived with groups GPX and GPZ, the positive polarity being derived with group GPY, for another 60°, and so on. As seen in FIG. 4, which is an illustration of an AC motor drive application, between windings WX and WY the line-to-line voltage is zero, whereas, on a per-unit basis for the two other pairs, the voltage varies between 2 and 1 line-to-line. However, the "hidden" DC-link voltage is here considered on a line-to-input neutral basis. With this understanding, the arrangement of FIG. 2 may be considered as a converter which, when properly fired, will operate as an AC/DC converter. FIG. 2 shows a control system CNS for controlling by lines 11 the gating circuit GC for the nine bilateral switches XA to ZC. Between two input phase lines $L_1$, $L_2$, from lines 1 and 2 is sensed the line-to-line voltage $v_{12}$ applied by line 3 as an electrical angle reference to the control system. Reference signals $v_X{}^*$, $v_Y{}^*$, $v_Z{}^*$ characterizing the motor currents $i_x$, $i_y$, $i_z$ are applied on lines 20, 21 and 22 to the control system CNS. Another reference signal, for the overall group voltage demand, vG is applied on line 3 to the control system CNS. When using pulse-width modulation, as illustrated hereinafter, each group voltage demand reference signal is set to maximum voltage.

If the "hidden DC-link" is used as such for generating AC current on the three-line output system, for instance by pulse-width-modulation, the voltage source inverter function becomes available like in a standard VSI system. It also appears from FIG. 3, that while the ripple voltage $V_{AN}$, $V_{BN}$, $V_{CN}$ . . . goes from one natural commutation point to another, a delaying angle α for firing from each of such points will provide a phase-to-neutral voltage on output phase lines X, Y, Z of smaller magnitude. The invention will be described for the sake of simplicity in the case where such delaying angle is zero, like on FIG. 3, and where the average DC voltage is shown in dotted line.

Figure 5:
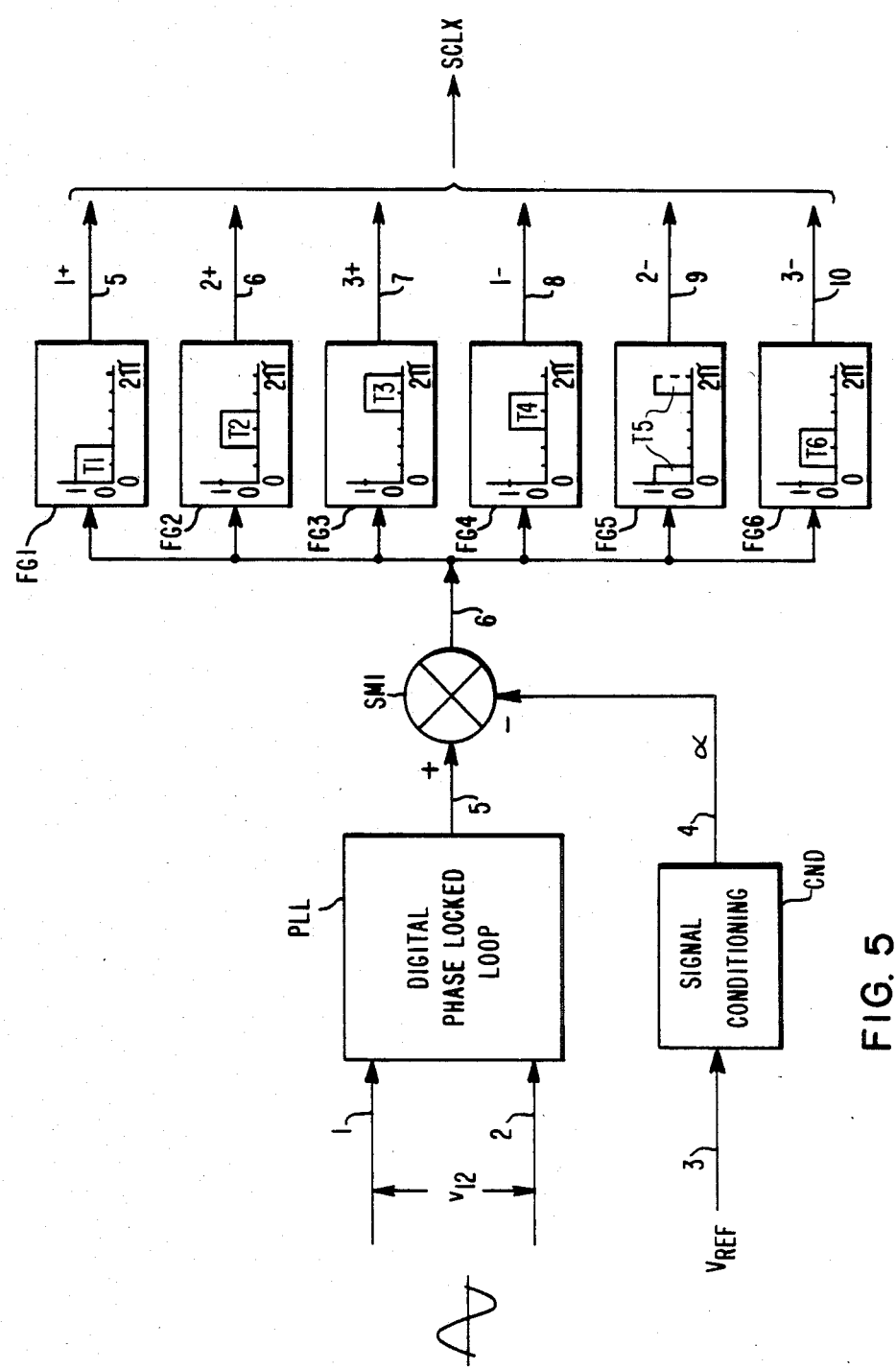
FIG. 5 is a schematic representation of a circuit used to generate with existence functions DC-link voltages according to FIG. 4.

Referring to FIG. 5, six-function generators FG1, FG2 . . . FG6 are shown which define in electrical angles each a time interval (T1, T2, . . . T6) and a polarity (positive for FG1, FG2, FG3; negative for FG4, FG5 and FG6) during which the hidden DC link voltage VXN, VYN and VZN is applied as derived with the hidden rectifier function and with a corresponding polarity as characterized by the existence function. FIG. 4 considered in relation to FIGS. 3 and 5 shows how the time intervals (T1–T6) defining the polarities are distributed among the arches of the ripple for each polarity and between the three phase lines X, Y, Z.

Figure 6:
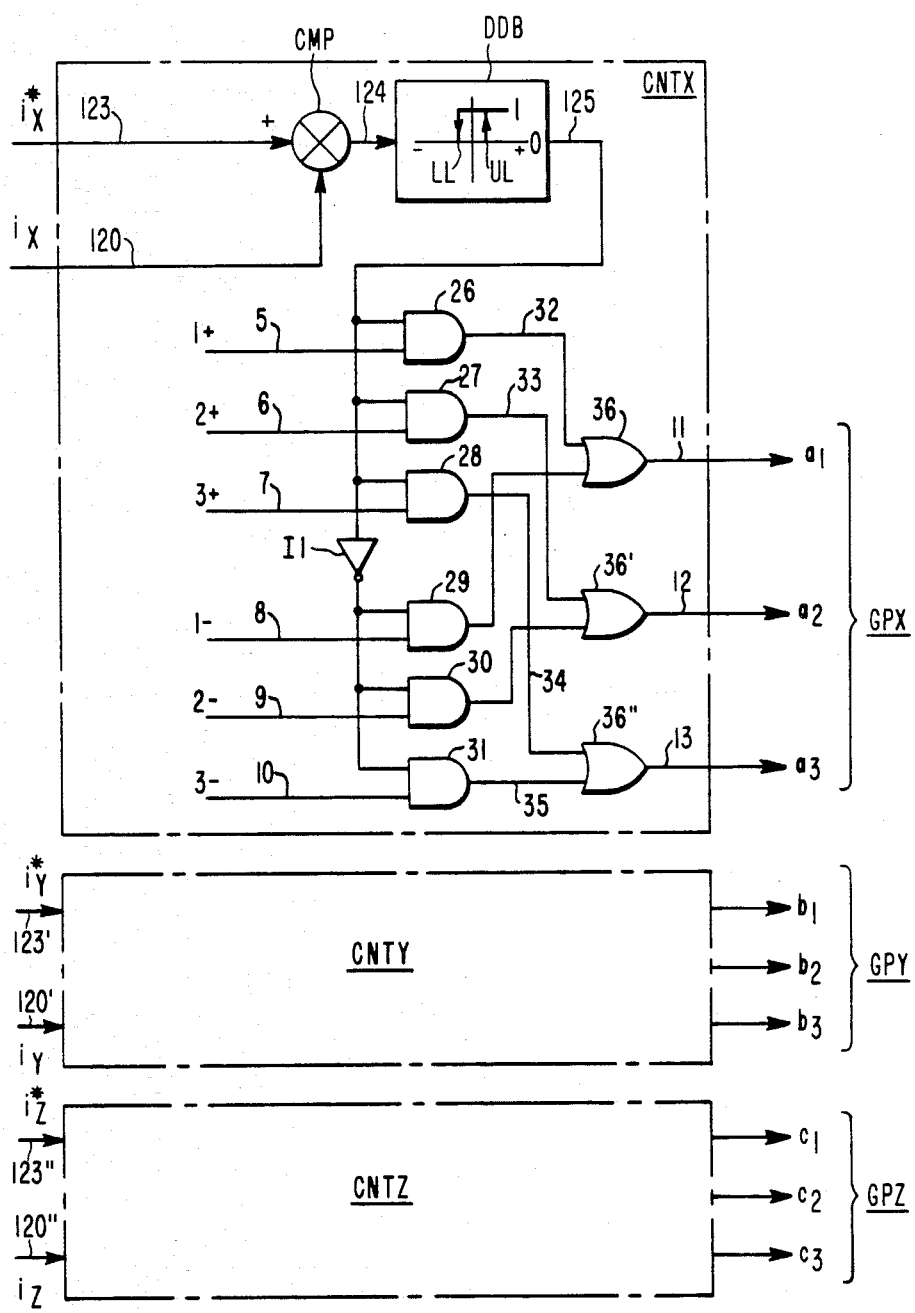
FIG. 6 is a diagram representation of the switching control logic used under bang-bang response to an error between the reference current signal and the feedback current signal of the control system according to the invention.

FIG. 6 shows at the upper part how the bang-bang technique (as explained hereinafter) can be applied to such hidden DC-link voltages VXN, VYN, VZN so as to maintain the AC current on lines X, Y and Z at the AC output within the limits vL and LL of a deadband relative to a feedback reference signal for the load. The invention is applicable to a motor drive. According, like in FIG. 1, FIGS. 2 and 4 show the three lines X, Y, Z connected to the respective windings WX, WY, WZ of an induction motor MT.

Stated another way, the system comprises 9 bilateral switches XA–XC, YA–YC, ZA–ZC distributed among three like groups GPX, GPY, GPZ. Within a group, the three switches (XA, XB, XC) are selected in response to a corresponding one of the existence functions derived from function generators FG1 to FG6, one at a time, according to either a positive, or a negative polarity, according to the switching pattern. At any time, each group is chosen to be either a positive, or a negative group, as explained hereinafter and as shown in FIG. 5, for the various existence functions (FG1–FG6), and the corresponding switching pattern prevails within such group. Both positive and negative switching patterns are synchronized, i.e. phase-locked (PLL on FIG. 5) to the main supply (by reference to the line-to-line voltage v12 derived on lines 1 and 2 from L1 and L2 for instance, FIG. 5). The positive group switching is arranged so that the group will produce a definite mean positive output voltage relative to neutral. Similarly, the negative group switching is arranged to produce an equal and opposite mean negative voltage. The level of the group output voltage (positive, or negative) can be adjusted by phase-shifting the switching patterns applied to the voltage of the main supply (lines L1, L2, L3). Such voltage level is determined by the controller according to the required mode of operation. The choice of a group as positive, or negative, can be changed at any time, subject only to practical switching limitations. With such arrangement, therefore, the line-to-line output voltages will either be zero (between VXN and VYN in FIG. 4) or have a mean value equal to plus, or minus, twice the group voltage set by the controller (between VXN and VZN, or between VYN and VZN in FIG. 4). Although each group acts as a three-pulse rectifier/inverter, the voltage between lines is, in fact, constituted by two such groups operated with phase-shifted switching patterns. The output line-to-line voltage, thus, amounts to the output of a six-pulse converter with phase control.

Accordingly, the invention provides first for positive and negative patterns applied on the respective groups GPX, GPY and GPZ. This can be accomplished in different ways, which all require sensing one phase of the voltage of the three-phase lines L1, L2, L3, and its zero-crossings. A preferred approach is illustrated by FIG. 5. A phase-locked loop PLL, synchronized with the line-to-line voltage $v_{12}$ sensed between phase lines L1 and L2 and derived from lines 1 and 2, is locked to the supply line voltage and provides on line 5 a signal representing the electrical angles counted from the instant when v12 corresponds to 60°. This is generally known. If necessary, a display angle $\alpha$ may be added by line 4 as a subtrahend to line 5 via a subtractor SM1. The delay angle is defined from a reference signal $v_{ref}$ on line 3, passed into a signal conditioning circuit CND providing on line 4 the delay angle $\alpha$ so derived. For the purpose of illustration, it is here assumed that $\alpha=0$. Therefore, the signal of line 6 matches the signal of line 5. Line 6 goes to six function generators FG1-FG6, providing on respective lines 5-10 signals which each define ⅓ of 360°, or a range of 120°. Accordingly, on line 5 is outputted by circuit PLL a signal indicating the absolute phase of the input AC power supply in a range from zero to $2\pi$ radians, zero radian corresponding to the instant when $v_{12}$ is at 60°. Ignoring the signal of line 4 under the assumption that the delay angle $\alpha$ is zero, as the case is for operation in the pulse width modulation mode, on line 6 each of function generators GP1-GP6 receives as one coordinate the running amount of radians.

Thus, FG1 provides on line 55 a ONE for a first range of 120° with the assigned positive polarity. FG2 outputs on line 56 a signal having a ONE defining a second range of 120° also with positive polarity assigned. FIG. 3 generates on line 57 a ONE for the third range of 120° and for the same positive polarity. In the same fashion, function generators FG4, FG5 and FG6 provide three separate ranges of 120 electrical degrees for the negative polarity with, however, a phase shift, relative to those of the positive polarity, by 180°. The outputs of FG4, FG5 and FG6 are respective lines 58, 59 and 60.

FIG. 6 shows how the signals of lines 55 to 60 are applied to three switch control logic circuits SCLX, SCLY and SCLZ which relate to the respective groups GPX, GPY and GPZ. FIG. 5 shows how a switching pattern is established to which, as shown BY FIG. 6, a deadband control signal is applied according to the bang-bang technique so as to effect current control by modulated switching of the bilateral switches in each separated group GPX, GPY and GPZ.

The bang-bang technique is well known. For the purpose of disclosing the control method according to the invention, U.S. Pat. Nos. 3,636,430 and 3,668,150 which relate to the bang-bang technique, are hereby incorporated by reference.

Referring to FIG. 6, a feedback signal $i_x$ representing the current of line X to the motor, and a reference signal i* are applied on lines 120 and 123, respectively, as inputs to a comparator CMP outputting on line 124 an error signal. A deadband having an upper limit UL for the positive error and a lower limit LL for the negative error of line 124, is introduced by a controller DDB having an hysteresis loop which outputs on line 125, in response to the sign and magnitude of the error signal of line 124, a one (below LL) or a 0 (exceeding UL), which according to the bang-bang technique require a positive polarity (lines 5, 6 or 7 from function generators FG1, FG2, FG3 of FIG. 5) or a negative polarity (lines 8, 9 or 10 from function generators FG4, FG5, FG6 of FIG. 5)

or to bring the error back across the reference signal level of line 123. Accordingly, for group GPX within controller CNTX, line 125 is inputted together with (1) line 5 as input to AND device 26, or (2) after inversion by inverting circuit I, with line 8 as input to AND device 29. The outputs 32 from AND device 26, and 32' from AND device 29 are inputted into OR device 36 to provide on line 11 a signal $a_1$ for the gating circuit in relation to bilateral switch XA of group GPX. The same can be said for line 125, together with line 6 or 9 and AND device 27 or 30, with OR device 36' and line 12 carrying a signal $a_2$ for bilateral switch XB. Similarly, line 125 is associated with lines 7 and 10 which input into AND devices 28 and 31, respectively, then go to OR device 36" and line 13 carrying a signal $a_3$ relative to bilateral switch XC.

In the same fashion, the feedback signal $i_Y$ of line Y and the reference signal $i_Y^*$ are, by lines 120' and 123', respectively, compared within control circuit CNTY which outputs on lines $b_1$, $b_2$, $b_3$ conduction control signals, according to the switching pattern prescribed by the error above or below $i_Y^*$, for bilateral switches YZ, YB and YC of group GPY. Similarly, for control circuit CNTZ, and switches ZA, ZB, ZC of group GPZ, signals $i_Z$ and $i_Z^*$ are applied by lines 120" and 123" and the controlling outputs are C1, C2, C3.

Referring to FIG. 7, the reference signal $i_X^*$ is shown under (a) with the upper limit UL and the lower limit LL defining the deadband of block DDB in FIG. 6. At A the feedback current $i_X$ of line 120 tends to exceed the lower limit LL. Therefore, line 125 applies a one to circuit CNTX which couples the operative AND device (26-31) to belong to the opposite polarity group (26-28), rather than (29-31), and therefore the control circuit CNTX shall operate with a function of the positive polarity (GF1-GF3), rather than a function of the negative polarity (GF4-GF6). As a result, the actual current on the X line is forced to increase along AB, to exceed $i_X^*$ and eventually reach the upper limit UL at B, at which time, the signal of line 125 becomes a zero. By a reverse process the switching pattern ($a_1$-$a_3$) of control circuit CNTX is switched to the opposite polarity and the current of line $i_x$ is forced to decrease, to cross line $i_x^*$ and to reach another limit point C on the lower limit level LL, and so on. Under (b) are shown the durations between deadband operations when following the trajectory ABCDEFGHIJK. This is the bang-bang technique of U.S. Pat. Nos. 3,636,430 and 3,668,150. What is shown in FIG. 7 for line X, is occurring also for lines Y and Z and the corresponding control circuits CNTY and CNTZ.

Referring to FIG. 8, the feedback loop of line 120 from the current sensor CS deriving a signal representative of $i_X$, is shown for group GPX. A simplified representation of the switches is made by showing a switch SW1 associated with the positive polarity $+V_{XN}$ and a switch SW2 associated with the negative polarity $-V_{XN}$ of FIG. 4. When the signal of line 125 is a one, by line 105 switch SW1 is caused to be closed, thereby forcing the current to increase. When the signal of line 125 is a zero, by line 106 and through inverting circuit I, the signal causes SW2 to close (and SW1 to open) thereby forcing current to decrease.

Figure 9:
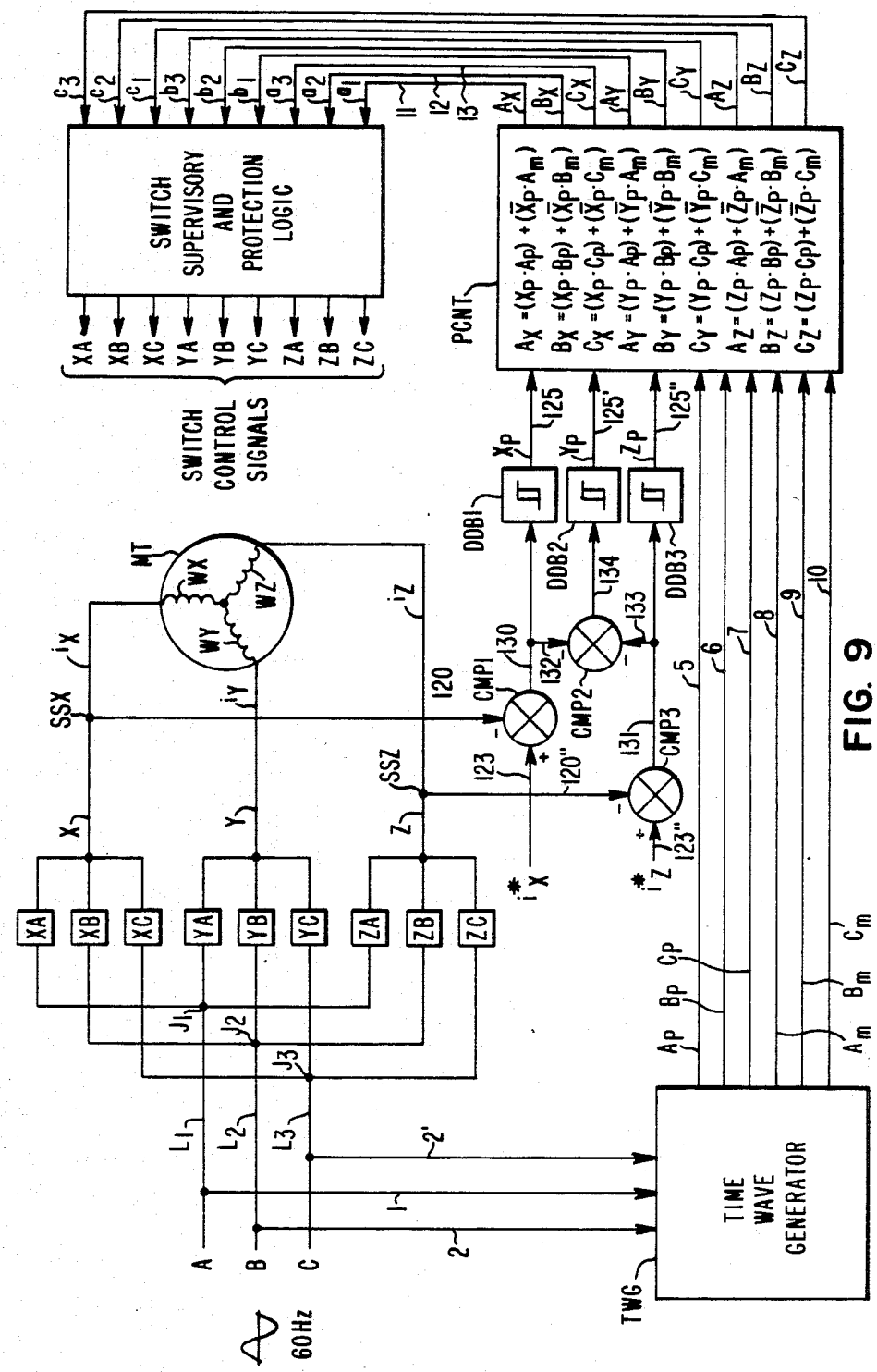
FIG. 9 shows the matrix converter according to the present invention as can be implemented digitally with a look-up table.

FIG. 9 shows the overall organization of the control system according to the invention for the three control circuits CNTX-CNTZ. Like in FIG. 2 the three input lines $L_1$, $L_2$, $L_3$ lead to the three groups of bilateral switches GPX (XA, XB, XC), GPY and GPZ, via junction points $J_1$, $J_2$, $J_3$. The output lines X, Y, Z from the respective groups lead to the star-connected windings WX, WY, WZ of a motor MT. The three voltages of line $L_1$, $L_2$, $L_3$ are applied to a timing wave generator PLL which is phase-locked, and which outputs on lines 5–10 signals Ap, Bp, Cp for the positive polarity (lines 5–7), and signals $A_m$, $B_m$, $C_m$ for the negative polarity (lines 8–10), after conditioning and function transferring as shown in FIG. 5.

Only two currents are necessary to ascertain all three on output lines X, Y, Z. Therefore, sensor SSX provides a signal representative of $i_X$, on line 120 to comparator CMP1 which receives the reference signal $i_X{}^*$ on line 123, and sensor SSZ provides a signal representative of $i_Z$, on line 120″ to comparator CMP3 which receives the reference signal $i_Z{}^*$ on line 123″. The output from comparator CMP1 goes by line 130 to deadband controller DBB1, which is a hysteresis type current controller generating a bang-bang control signal on line 125. Similarly, comparator CMP3 leads by line 131 to deadband controller DDB3 which is another hysteresis type current controller generating a bang-bang control signal on line 125″. Line 132 from line 130, and line 133 from line 131 add up into a comparator CMP2 to provide on line 134 the error relative to phase Y, and a hysteresis type current controller DDB2 responds to the error of line 134 to provide on line 125′ a bang-bang control signal assigned to phase Y.

The signals are Xp, or $\overline{Xp}$ on line 125, Yp, or $\overline{Yp}$ on line 125′ and Zp, or $\overline{Zp}$ on line 125′, depending upon whether the error is positive or negative within the deadband. On the other hand, coming from the time wave generator TWG, lines 5–10 provide signals Ap, Bp, Cp when the switching pattern indicate positive polarity and Am, Bm, Cm for the negative polarity. A programmable ROM, PCNT generates on lines 11, 12, 13 for group GPX, on lines 11′, 12′, 13′ for group GPY and on lines 11″, 12″, 13″ for group GPZ, signals AX, BX, CX; AY, BY, CY and AZ, BZ, CZ, respectively, which correspond to the following logic table:

$AX = (Xp \cdot Ap) + (\overline{Xp} \cdot Am)$ $BX = (Xp \cdot Bp) + (Xp \cdot Bm)$ $CX = (Xp \cdot Cp) + (\overline{Xp} \cdot Cm)$ $AY = (Yp \cdot Ap) + (\overline{Yp} \cdot Am)$ $BY = (Yp \cdot Bp) + (\overline{Yp} \cdot Bm)$ $CY = (Yp \cdot Cp) + (\overline{Yp} \cdot Cm)$ $AZ = (Zp \cdot Ap) + (\overline{Zp} \cdot Am)$ $BZ = (Zp \cdot Bp) + (\overline{Zp} \cdot Bm)$ $CZ = (Zp \cdot Cp) + (\overline{Zp} \cdot Cm)$ The signals of lines (11–13), (11′–13′) and (11″–13″) go to the gating circuits for roups GPX, GPY and GPZ, controlling the times of conduction of XA, XB, XC, YA ... ZC in accordance with the switching pattern of lines 125, 125′, 125″ and with modulation or polarity switching of the output voltage VXN, VYN, VZN, as illustrated in FIG. 7 under (b) for the matrix converter of FIG. 2.

In this way, the motor currents are controlled with optimum bandwidth and accuracy, limited ultimately by the switching frequency which can be achieved.

Figure 10:
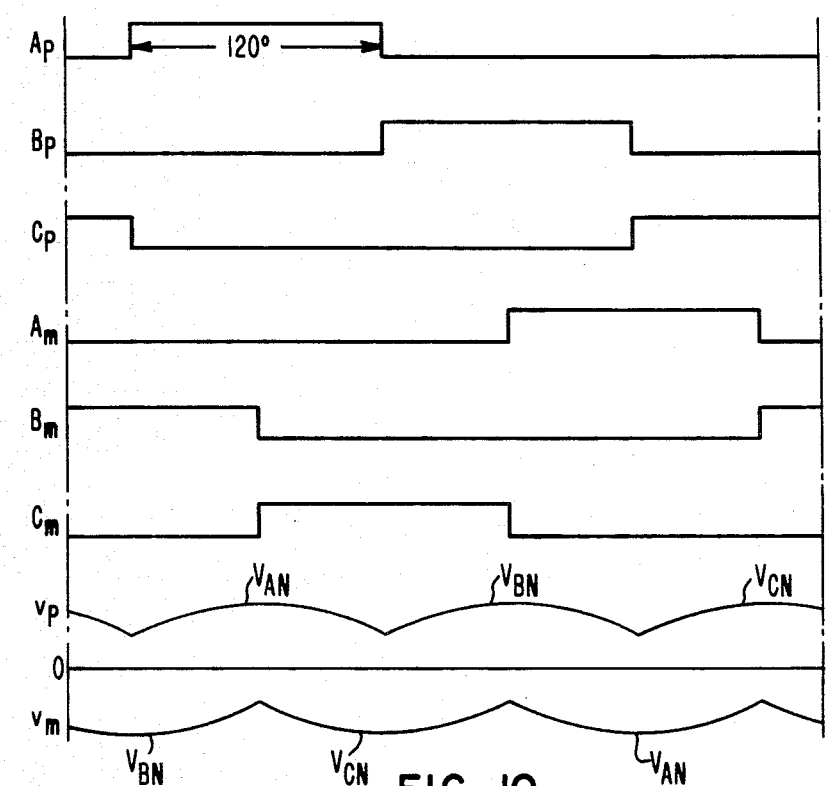
FIG. 10 shows in association with the voltage ripple the timing waves generated by the timing wave generator of FIG. 9.

Referring to FIG. 10, curves are shown illustrating the time relationship between the timing waves of lines (11–13), (11′–13′) and (11″–13″) of FIG. 8, namely (Ap–Cp), (Am–Cm), and the resulting positive and negative envelopes of the input phase-to-neutral lines.

Figure 11:
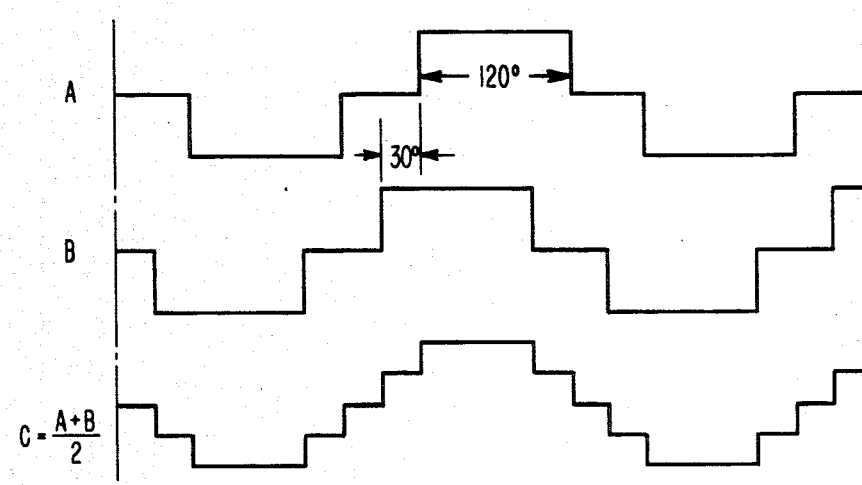
FIG. 11 illustrates with curves a method of harmonic reduction of the prior art performed by phase shifting and averaging effected on two quasi-square waves.
Figure 12:
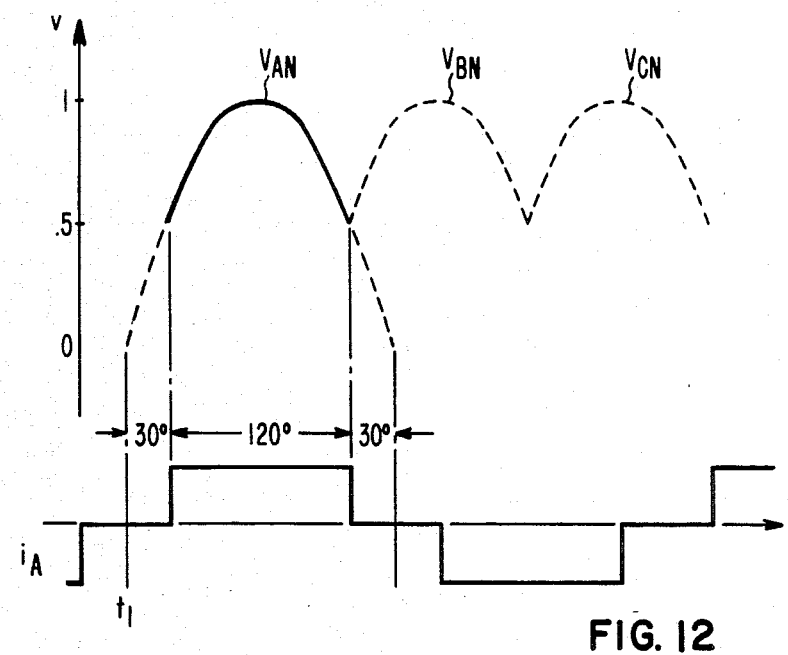
FIG. 12 illustrates schematically the quasi-square shape on the input phase line current in relation to the line-to-neutral voltage at the input of two groups of bilateral switches operating with the same polarity.

The present invention, under another form of implementation makes use of the technique shown by FIG. 11. Assuming a waveform is quasi-square shaped, as shown by A or B in FIG. 11, it is known in the prior art that, if we establish a phase shift of 30 degrees between two such quasi-square waves (A and B in FIG. 11), the average derived from those two shifted waves (namely $$\frac{A+B}{2}$$

is a new wave such as C in FIG. 11. Curve C exhibits a substantial decrease in the 5th and 7th harmonic contents, actually only 13%. See also U.S. Pat. No. 4,225,914. Considering now FIG. 12, and the input voltage-to-neutral $V_{AN}$, this voltage is occurring, as illustrated in FIG. 4, on two output phases X and Y when switches XA and YA of groups GPX and GPY, respectively, are connecting input phase A through both groups onto the output side. The current $i_A$, which is drawn from phase A at the input, is the sum of the two currents passing through GPX and GPY, as just explained. This curve, shown in FIG. 12, is a quasi-square wave, like curve A or B of FIG. 11.

According to the second implementation of the invention, the quality of the current derived from the input phases ($i_A$, $i_B$, $i_C$) is improved by effecting a phase shifting of 30 degrees on the current waves by analogy to the technique of FIG. 11. This is accomplished by causing a change of firing retardation angle $\alpha$ alternately from $-15$ degrees (advance) to $+15$ degrees (retard) about the natural commutation point NC (FIG. 3) for each arch $V_{AN}$, $V_{BN}$, $V_{BN}$ and at both ends thereof, for either polarities. This technique of modifying the retardation angle $\alpha$ is applied on line 4 of FIG. 5 in the generation of the existence functions of function generators FG1 to FG6 of FIG. 5. The effect upon the existence functions so generated will appear from a consideration of FIG. 13.

From curves (d) and (e), it is seen: (1) that when $\alpha$ at the input of summer SM1 of FIG. 5 is made $+15°$ (advance), before the natural commutation point NC the logic which is zero, becomes a ONE, as a result of the edge having been shifted to the left; (2) that when a retardation of $-15°$ has been made, after the natural commutation point NC, the logic which would have become a ONE, will still be ZERO, and this until 15° beyond the natural commutation point occurrence.

This is effected at high frequency, back and forth, resulting in a logic signal, such as shown by curves (f), as a function of time. The overall effect on the basic time wave ((a) in FIG. 13) will be to change, for 15 degrees before the edge, the logic ZERO into a discrete succession of logic ONE then to produce after the normal occurrence of the edge, in FIG. 13 under (a), another succession for another 15 degrees of the logic ZERO instead of a continuous logic ONE. The same is done with the occurrence of the trailing edge (curve (a) of FIG. 13) resulting in another continuous discrete succession of alternate logic states ONE and ZERO for a total of 30 degrees. This is shown for an entire timing wave by FIG. 15 for output signals Ap to Cp and Am to Cm, as shown under (b). Referring to FIG. 14, the voltage curve $V_{AN}$ is shown with the commutation point NC and the two levels at points a and b which respectively correspond to $-15$ and $+15$ angles of retardation about the zero degree angle. It appears that when the operating point on the voltage curve describes its trajectory, the alternative changing of retardation angle $\alpha$ about the zero degree value results in a voltage variation at the same rhythm of high frequency alternation of the voltage output on line X, Y or X. This is shown by curves (b) of FIG. 5. Again, the two excursions by 15 degrees result in an overall spread of 30 degrees. Therefore, the equivalent of a 30 degree phase shift as in FIG. 11 is obtained with the resulting improvement in quality of the input current, ($i_A$, $i_B$ and $i_C$) regarding the 5th and 7th harmonics.

Figure 13:
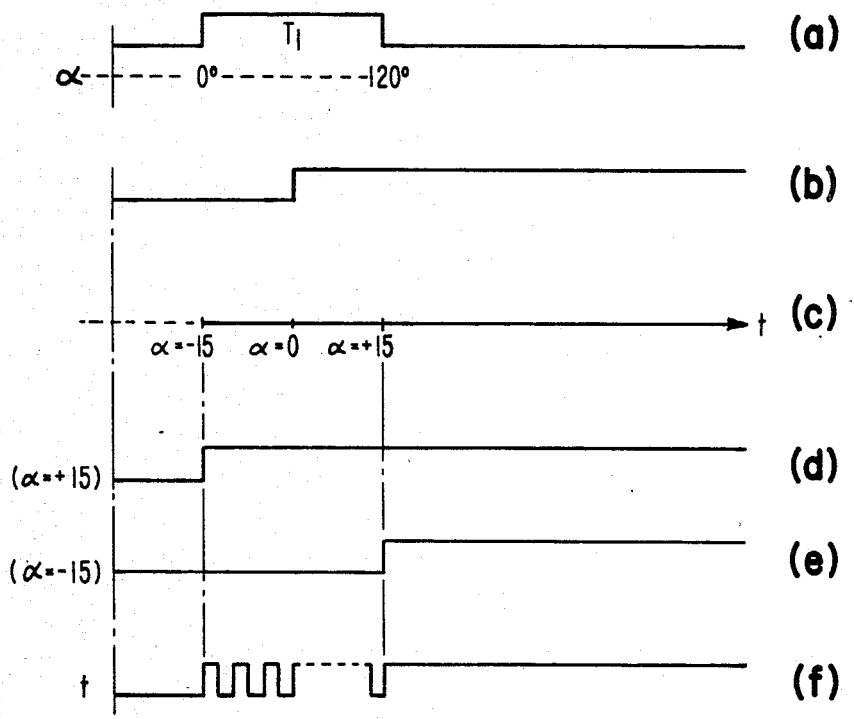
FIG. 13 shows one time wave reference as derived from one function generator like in FIG. 5, or as shown in FIG. 10, and additional curves showing the effect thereon of changing the retardation firing angle α of FIG. 5 alternately from −15 to +15 at a high frequency.
Figure 14:
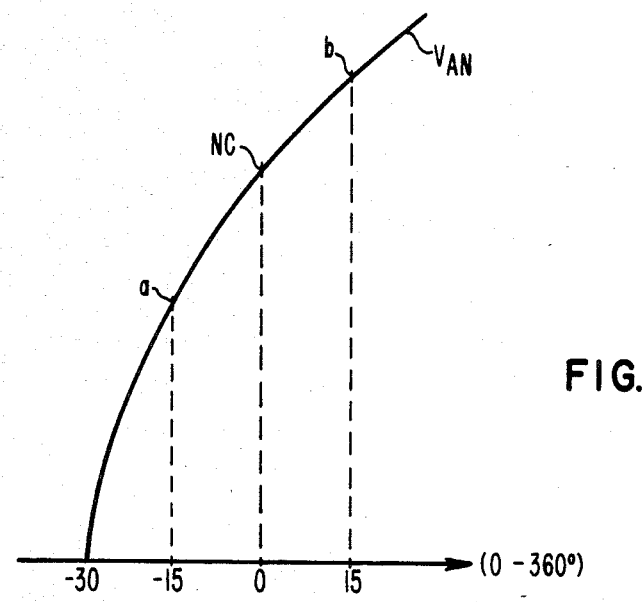
FIG. 14 illustrates the voltage magnitude excursions above and below the level of the natural commutation point when α is advanced and retarded by 15 degrees.
Figure 16:
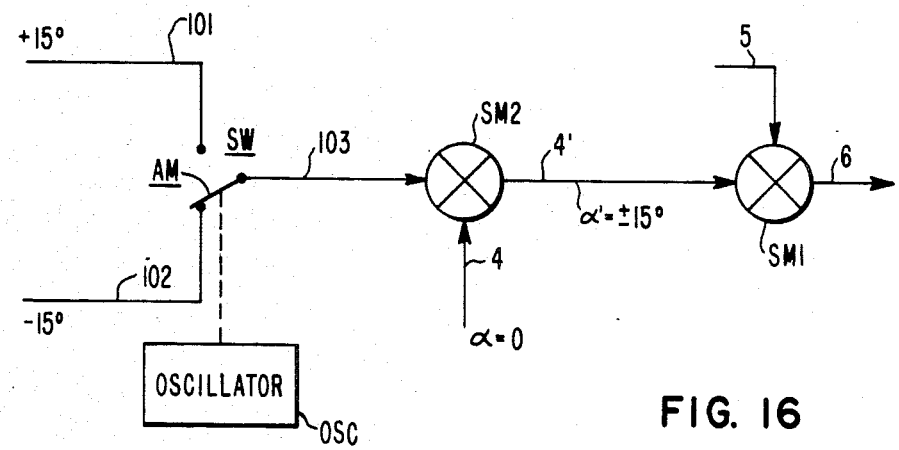
FIG. 16 shows in block diagram the implementation of a variable retardation firing angle in relation to the reference input phase line timing wave to generate logic control signals like in FIG. 15 under the method of FIGS. 13 and 15.
Figure 15:
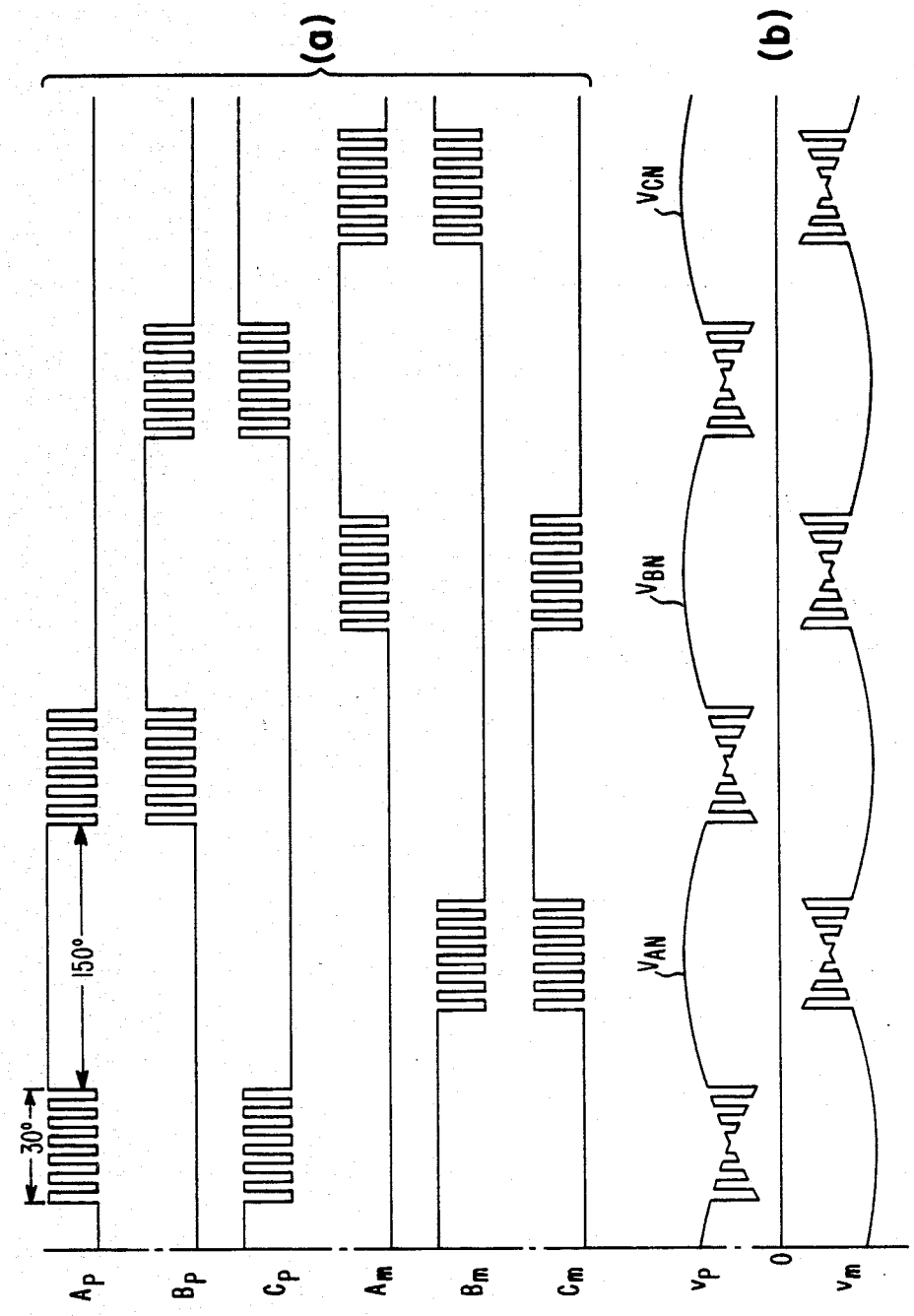
FIG. 15 shows the form of the existence function produced by the function generators of FIG. 5 as a result of the advances and retardations of α of FIG. 13.

FIG. 16 shows in block diagram an implementation of the method of FIGS. 13 and 15. FIG. 16 is like FIG. 5, where a summer SM2 has been added ahead of summer SM1. Summer SM2 receives normally the reference for retardation $\alpha=0$ on line 4, and on line 103 the alternating advance and retardation by 15 degrees, so that on line 4' the angle $\alpha'=\pm15°$ is obtained and applied to summer SM1, which otherwise receives on line 5 the time wave from the phase-locked loop circuit PLL of FIG. 5. The generation of the signal of line 103 is illustrated by the incoming advance ($-15$ degrees) signal on line 102 and the incoming retardation ($-15$ degrees) signal on line 101, which are passed alternatively by a switch SW controlled by an oscillator OSC so that the moving arm AM be positioned either on line 101 or on line 102 at this very frequency.

It is understood, that instead of using the hardware approach of FIG. 16, modern software techniques are possible and even preferred. This is done with programmable memory devices containing lookup tables leading to the very same shape as shown under (a) in FIG. 15. This will be accomplished with a timing wave generator built up with software in FIG. 9. The signals Ap to Cp and Am to Cm of lines 5 to 10 will be shown in FIG. 15, curves (a). Indeed, it is also possible to choose more sophisticated such curves in order to improve further the resulting curves vp and vm under (b) in FIG. 15. Thus more rounded shapes for the voltage curves can be obtained with such software technique. In such case, existence functions having discrete pulses spread forward and backward with different width, as one can choose, will lead to such improvements. These techniques are illustrated by U.S. Pat. Nos. 4,099,109 and 3,614,590.

These techniques will obviously allow by successive approximations, like has been done in the illustration for the 5th and 7th harmonics, to eliminate all low order harmonics in the AC input current, as desirable. Thus, it will be possible to selectively extend the modulation of $\alpha$ beyond the 15° zone and to combine this with varying pulse widths, rather than equal width pulses as earlier illustrated, whereby the AC input current will approximate the ideal sine wave shape, after the high frequency modulation effect has been filtered out. The invention is applicable to variable frequency AC motor drive control.

What is claimed is:

1. In a three-pulse UFC system including three groups of three bilateral switches, each group being associated with a corresponding one of three AC output lines connected to a load, each bilateral switch in a group being associated with a corresponding one of three AC input lines of an AC power supply; the combination of:

function generator means operating in synchronism with said AC input power supply for generating respective control signals for firing said switches in the respective groups and for establishing conduction time intervals in accordance with a switching polarity pattern for said groups in the respective AC input lines thereof;

feedback means responsive to current flowing in said load from said AC output lines for providing a feedback current signal;

means for providing an AC reference current signal for said load;

comparator means responsive to said feedback means and said reference means for providing an error signal representing the difference between said feedback current signal and said current reference signal; and deadband hysteresis means having an upper and a lower limit in the response to said error signal in either direction relative to said reference signal for providing a corrective signal;

said corrective signal being applied on the output of said function generator means for modulating said switching polarity pattern and for establishing through said bilateral switches on said AC output lines an output current in accordance with said corrective signal; thereby to force said load current to follow said reference signal.

2. The system of claim 1 with said function generator means providing respective existence functions establishing said conduction time intervals for said groups respectively and for an associated polarity.

3. The system of claim 2 with said corrective signal modulating said existence functions.

4. The system of claim 2 with means being provided for advancing and retarding said existence functions by a predetermined amount at a frequency substantially higher than the frequency of said AC input power supply.

* * * * *